United States Patent [19]

Schmalstieg et al.

[11] Patent Number: 5,574,124
[45] Date of Patent: Nov. 12, 1996

[54] ISOCYANATE PREPOLYMERS, A PROCESS FOR THEIR PREPARATION AND THEIR USE

[75] Inventors: Lutz Schmalstieg, Köln; Rainer Rettig, Kürten; Ulrich Walter, Hilden, all of Germany; Edwin R. Hortelano, Houston, Tex.

[73] Assignees: Bayer Aktiengesellschaft, Leverkusen, Germany; Bayer Corporation, Pittsburgh, Pa.

[21] Appl. No.: 510,887

[22] Filed: Aug. 3, 1995

[30] Foreign Application Priority Data

Aug. 17, 1994 [DE] Germany .......................... 44 29 076.4

[51] Int. Cl.$^6$ .......................... C08G 18/42; C08G 18/44; C08G 18/48; C07C 269/02
[52] U.S. Cl. .................. 528/59; 528/67; 528/76; 528/77; 528/80; 560/26; 560/115; 560/330; 560/336; 560/354; 560/358; 560/360
[58] Field of Search .................. 528/59, 76, 77, 528/67, 80; 560/26, 115, 336, 354, 358, 360, 330

[56] References Cited

U.S. PATENT DOCUMENTS

| | | | |
|---|---|---|---|
| 3,428,610 | 2/1969 | Klebert | 528/64 |
| 3,567,692 | 3/1971 | Haggis et al. | 528/64 |
| 3,640,967 | 2/1972 | Konig et al. | 528/80 |
| 3,743,626 | 7/1973 | Emmons | 428/355 |
| 4,385,171 | 5/1983 | Schnabel et al. | 528/491 |
| 4,433,010 | 2/1984 | Pedain et al. | 427/160 |
| 5,051,152 | 9/1991 | Siuta et al. | 203/49 |
| 5,202,001 | 4/1993 | Starner et al. | 203/49 |

FOREIGN PATENT DOCUMENTS 3132124  3/1983  Germany .

*Primary Examiner*—James J. Seidleck
*Assistant Examiner*—Rabon Sergent
*Attorney, Agent, or Firm*—Joseph C. Gil; Thomas W. Roy

[57] ABSTRACT

Isocyanate prepolymers having an NCO content of 1.5 to 5.0 wt. % and a monomeric diisocyanate content of less than 0.5 wt. % which are the reaction products of A) aromatic or cycloaliphatic diisocyanates with
B) mixtures of
   B1) polyether polyols having a molecular weight of 1000 to 3000 and
   B2) polyester carbonate diols having a molecular weight of 700 to 3000,
   wherein components B1) and B2) are present in a weight ratio of 0.25:1 to 1.5:1;

a process for the preparation of these isocyanate prepolymers by reacting the preceding starting materials at an NCO/OH equivalent ratio of at least 1.5:1 and optionally with subsequent removing unreacted monomeric diisocyanate by distillation; and the use of these isocyanate prepolymers as binders for sealing or coating compositions.

14 Claims, No Drawings

ISOCYANATE PREPOLYMERS, A PROCESS FOR THEIR PREPARATION AND THEIR USE

BACKGROUND OF THE INVENTION

1. Field of the Invention

The present invention relates to new isocyanate prepolymers based on selected starting materials, a process for their preparation and their use for producing sealing and coating compositions.

2. Description of the Prior Art

Binders for sealing or coating compositions based on isocyanate prepolymers and compounds which are (potentially) reactive with isocyanates are very well known. For example, DE-OS 1,520,139 describes a process for preparing moisture hardening mixtures of polyisocyanates and polyketimines or polyaldimines, wherein isocyanate prepolymers (NCO prepolymers) are preferably used as polyisocyanates. DE-AS 1,240,654 describes a process for preparing cross-linked plastics from NCO prepolymers and special aromatic diamines. DE-OS 2,018,233 describes compositions made from compounds with isocyanate groups and polyoxazolidines, which can be hardened by moisture.

All of these publications have the common feature that the NCO prepolymers used are those known from polyurethane chemistry, e.g., those prepared by reacting high molecular weight polyhydroxyl compounds, such as polyetherpolyols or polyesterpolyols, with excess amounts of di- or polyisocyanate.

For coating externally located mineral substrates, there is a need for NCO prepolymers which are simultaneously resistant to the effects of light and to saponification. NCO prepolymers based on polyether polyols have a high resistance to saponification but are known to be less stable to light. NCO prepolymers based on polyester polyols, on the other hand, have a high resistance to light but may not be applied in direct contact with mineral substrates due to their poor resistance to saponification.

Although NCO prepolymers based on polycarbonate polyols satisfy the requirements of resistance to light and saponification, these prepolymers are extremely viscous and crystalline and can only be applied by using large amounts of solvent.

Although, prepolymers based on polyester carbonate polyols of the type described in DE-OS 3,200,430 can be used, they have the disadvantage that they are always very viscous so they can only be processed by adding plasticizers or solvents.

The use of solvents, however, is known to be a disadvantage from an ecological standpoint. The use of plasticizers is also associated with disadvantages. Plasticizers, which remain in the coatings, can impair the mechanical properties of polymers, reduce adhesion to the substrate and in the long term migrate out of the coatings.

It is an object of the present invention to provide new single or multi-component binders based on NCO prepolymers, which have lower viscosities than comparable prior art binders, while being highly resistant to light and hydrolysis.

This object may be surprisingly achieved by the isocyanate prepolymers containing ether, ester and carbonate groups described in more detail below, even though these prepolymers have both light-sensitive polyether chains and hydrolysis-sensitive ester groups.

SUMMARY OF THE INVENTION

The present invention relates to isocyanate prepolymers which have an NCO content of 1.5 to 5.0 wt. % and a monomeric diisocyanate content of less than 0.5 wt. %, and are the reaction products of A) an isocyanate component containing one or more aromatic or cycloaliphatic diisocyanates and B) a polyol component containing a mixture of B1) one or more polyether polyols having a molecular weight of 1000 to 3000 and an average hydroxyl functionality of 2 to 4 and B2) one or more polyester carbonate diols having a molecular weight of 700 to 3000 and prepared from (i) one or more diols having a maximum molecular weight of 200, (ii) ε-caprolactone and/or ε-hydroxycaproic acid and (iii) diaryl carbonates, wherein components (i) and (ii) are present in a molar ratio of 4:1 to 1:3, wherein component B1) and B2) are present in a weight ratio of 0.25:1 to 1.5:1.

The present invention also relates to a process for preparing these isocyanate prepolymers by reacting an isocyanate component A) containing one or more cycloaliphatic or aromatic diisocyanates with a polyol component B) containing a mixture of B1) one or more polyether polyols having a molecular weight of 1000 to 3000 and an average hydroxyl functionality of 2 to 4 and B2) one or more polyester carbonate diols having a molecular weight of 700 to 3000 and prepared from (i) one or more diols having a maximum molecular weight of 200, (ii) ε-caprolactone and/or ε-hydroxycaproic acid and (iii) diaryl carbonates, wherein components (i) and (ii) are present in a molar ratio of 4:1 to 1:3, wherein component B1) and B2) are present in a weight ration of 0.25:1 to 1.5:1, while maintaining an NCO/OH equivalent ratio of at least 1.5:1 and optionally removing unreacted monomeric diisocyanate down to a residual content of less than 0.5 wt. %.

Finally, the present invention also relates to the use of these isocyanate prepolymers for preparing sealing and coating compositions.

DETAILED DESCRIPTION OF THE INVENTION

Preparation of the isocyanate prepolymers according to the invention is accomplished by reacting diisocyanates A) with polyether polyols B1) and polyester carbonate diols B2) at a temperature of 40° to 120° C., preferably 50° to 100° C., while maintaining an NCO/OH equivalent ratio of 1.5:1 to 20:1, preferably 1.6:1 to 10:1. If chain lengthening via urethane group formation is acceptable or desired during preparation, an NCO/OH equivalent ratio of 1.5:1 to 2:1 is selected. If a chain lengthening reaction should be avoided, an excess of diisocyanate is used, corresponding to an NCO/OH equivalent ratio of 4:1 to 20:1, preferably 5:1 to 10:1, and the excess diisocyanate is removed after completion of the reaction by film distillation down to a residual content of unreacted diisocyanate of less than 0.5 wt. %, preferably less than 0.3 wt. %.

Starting component A) which is used in the process according to the invention is selected from aromatic or cycloaliphatic diisocyanates or mixtures thereof. Aromatic or cycloaliphatic diisocyanates are understood to be those which have at least one aromatic or cycloaliphatic ring per molecule, wherein preferably, but not necessarily, at least one of the two isocyanate groups is linked directly to an aromatic or cycloaliphatic ring. Suitable diisocyanates include aromatic or cycloaliphatic diisocyanates having a molecular weight of 174 to 300 such as 2,4-diisocyanatotoluene or mixtures thereof with preferably up to 35 wt. %, based on the weight of the mixture, of 2,6-diisocyanatotoluene, bis-(4-isocyanatocyclohexyl)methane, 1-isocyanato-3,3,5-trimethyl-5-isocyanato-methylcyclohexane (IPDI), 1-isocyanato-1-methyl-4(3)-isocyanatomethylcyclohexane, 1,3-diisocyanato-6-methylcyclohexane optionally mixed with 1,3-diisocyanato-2-methylcyclohexane and mixtures of these diisocyanates.

The use of diisocyanates A) which have isocyanate groups of different reactivity is preferred. Preferred diisocyanates of this type are 2,4-diisocyanatotoluene and 1-isocyanato-1-methyl-4(3)-isocyanatomethylcyclohexane, more preferably 2,4-diisocyanatotoluene. These diisocyanates are generally used at an NCO/OH equivalent ratio of 1.5:1 to 2:1 and directly provide, i.e., without film distillation, NCO prepolymers having a residual content of free diisocyanates of less than 0.5 wt. %.

Polyether polyols for use as component B1) according to the invention are prepared in known manner by alkoxylation of suitable starter molecules and have an average molecular weight, calculated from the hydroxyl functionality and hydroxyl group content, of 1000 to 3000, preferably 1500 to 2000. Suitable starter molecules include low molecular weight polyols, water, organic polyamines having at least two NH bonds and mixture thereof. Alkylene oxides suitable for alkoxylation are preferably particular ethylene oxide and/or propylene oxide. These alkylene oxides may be used in any sequence or in admixture during alkoxylation. It is also possible to incorporate monohydric polyether alcohols, provided that polyether polyols B1) have an average hydroxyl functionality of 2 to 4. The average hydroxyl functionality of polyether polyols B1) is preferably 2 to 3. Polyether polyols having a molecular weight of 1500 to 2000 are preferred, especially those which contain both ethylene oxide and propylene oxide in the polyether chain in a weight ratio of 30:70 to 60:40. In this case, the alkylene oxide units may be present both in the form of ethylene oxide or propylene oxide blocks and in a random distribution (use of mixtures of ethylene oxide and propylene oxide during alkoxylation). The preferred polyether polyols are particularly compatible with component B2).

The polyester carbonate diols which may be used as component B2) are those having an average molecular weight, calculated from the hydroxyl functionality and hydroxyl group content, of 700 to 3000, preferably 1500 to 2500. These polyester carbonate diols are reaction products of (i) a diol having a maximum molecular weight of 200, preferably 1,6-hexanediol, (ii) $\epsilon$-caprolactone or $\epsilon$-hydroxycaproic acid and (iii) diaryl carbonates, wherein the molar ratio of (i) to (ii) is 4:1 to 1:3, preferably 2:1 to 1:2 and more preferably 1.2:1 to 1:1.2. The preparation of these dihydroxy polycarbonates is performed using known methods, e.g., Houben-Weyl, XIV/2, p. 48 or U.S. Pat. No. 3,640,967.

The diol is initially reacted with $\epsilon$-caprolactone or $\epsilon$-hydroxycaproic acid with ring-opening or elimination of water to give an esterglycol, which is then thermally converted into the corresponding polyester carbonate having terminal OH groups using excess diaryl carbonate with elimination and removal of the corresponding phenol compound. Suitable diaryl carbonates include diphenyl carbonate, dinaphthyl carbonate and dicresyl carbonate.

It is critical to prepare the dihydroxy polyester carbonates while maintaining the previously disclosed ratio between components (i) and (ii) because dihydroxy carbonates which have been prepared outside these ratios either have melting points which are too high for use according to the invention or result in polyurethanes which do not possess sufficient resistance to saponification.

To prepare the isocyanate prepolymers according to the invention, polyol components B1) and B2) are used in a weight ratio of 0.25 to 1.5:1, preferably 0.5:1 to 1:1.

The isocyanate prepolymers according to the invention have an NCO content of 1.5 to 5, preferably 1.7 to 4.5 wt. %, and a monomeric diisocyanate content of less than 0.5 wt. %. The viscosity of the solvent-free products is generally less than 80,000, preferably less than 30,000 mPa.s (23° C.).

The isocyanate prepolymers according to the invention are particularly suitable as raw materials for formulating solvent-free or low-solvent coating or sealing compositions. The prepolymers can be cured by the action of atmospheric moisture, optionally after the addition of known catalysts, e.g., dibutyltin(IV) dilaurate, and optionally pigments, fillers and other additives known from coating technology. The resulting polymer films have outstanding mechanical properties and high resistance to light.

The NCO prepolymers according to the invention, optionally blocked with blocking agents for isocyanate groups, may also be admixed with suitable reactive components to provide self-curing compositions. In these compositions, the prepolymers according to the invention represent component a) and the isocyanate-reactive components represent component b).

Isocyanate-reactive components b) are selected from compounds having at least two groups which can react with isocyanate groups or at least two groups which can be hydrolytically converted such groups. It is also possible, but less preferred, to use compounds having both isocyanate-reactive groups and also reversibly blocked isocyanate-reactive groups. Further, it possible, but again less preferred, to use mixtures of compounds having isocyanate-reactive groups and compounds with reversibly blocked isocyanate-reactive groups. The compounds suitable for use as component b) preferably have 2 to 4 free or blocked isocyanate-reactive groups. The molecular weight of the compounds present in component b) is not critical. However, low molecular weight compounds are preferably used, i.e., those having a maximum molecular weight of 600.

The amount of component b) is generally selected so that the binder has an equivalent ratio of isocyanate groups in component a) to free and/or reversibly blocked isocyanate-reactive groups in component b) of 0.8:1 to 10:1, preferably 0.9:1 to 4:1, more preferably 1:1 to 2:1, and most preferably 1:1 to 1.2:1.

The following compounds are suitable for use as component b):

known polyoxazolidines such as those described in DE-PS 1,018,233 (=U.S. Pat. No. 3,143,626) or DE-OS 2,446,438 (=U.S. Pat. No. 4,002,601);

known polyketimines or polyaldimines such as those described in DE-OS 1,520,139 (=U.S. Pat. No. 3,420,800 or U.S. Pat. No. 3,567,692) or DE-OS 3,308,418 (=U.S. Pat. No. 4,481,345);

aromatic polyamines, in particular diamines with sterically hindered amino groups, such as those described in U.S. Pat. No. 4,218, 543 as chain-lengthening agents, preferably 1-methyl-3,5-diethyl-2,4-diaminobenzene or mixtures thereof with 1-methyl-3,5-diethyl-2,6-diaminobenzene; or polyhydric alcohols having a molecular weight of 62 to 399 or those having a molecular weight of at least 400.

Suitable low molecular weight alcohols include ethylene glycol, propylene glycol, butanediol-1,4, glycerine, trimethylolpropane, pentaerythritol, diethylene glycol, dipropylene glycol or mixtures thereof. Suitable high molecular weight alcohols include starting materials B1) and B2) and other polyhydroxyl compounds such as epoxide resins, phenol resins, alkyd resins, castor oil, polyester polyols or silicone resins having hydroxyl groups.

To prepare the two-component binder, individual components a) and b) are mixed with each other. When using isocyanate prepolymers a) having free isocyanate groups and compounds b) with reversibly blocked isocyanate-reactive groups, storage-stable compositions are obtained which are stable in the absence of moisture and which rapidly harden after application to a suitable substrate in the presence of moisture. If required, the curing reaction can also be accelerated by adding known catalysts known such as p-toluenesulphonic acid, dibutyltin octoate or zinc chloride.

When component b) has isocyanate-reactive groups which are not reversibly blocked, i.e. in particular amino or hydroxyl groups, and when isocyanate prepolymers a) have free NCO groups, reaction mixtures are produced which react at room temperature to give polyurethanes or polyureas. These mixtures only have a limited pot life and must be processed within this pot life.

When using isocyanate prepolymers a) having blocked isocyanate groups and isocyanate-reactive components with unblocked groups, in particular polyhydroxyl compounds, stoving systems are obtained which can be used to produce stoved enamels.

Suitable blocking agents are known and include ε-caprolactam, butanone oxime and diethyl malonate.

In general, the expression "two-component binder" indicates that the binder contains individual components a) and b) in unmixed form. The expression "one-component binder" indicates that the components are present in mixed form and that one or both of components a) and/or b) contains reversibly blocked groups.

Compositions containing optionally blocked isocyanate prepolymers a) and isocyanate-reactive components b) may be used without the use of other additives c) as coating compositions or sealants. Preferably, however, they are used in combination with known additives, e.g., solvents such as ethyl acetate, butyl acetate, methylethyl ketone, methylisobutyl ketone, methoxypropyl acetate, ethylene glycol monoethylether acetate, toluene, xylene, white spirit or mixtures thereof. It must be emphasized that according to the invention it is preferred to either use no solvent or only very small amounts of solvent. The solvents are used in amounts of up to 40, preferably up to 20 wt. %, based on the total weight of components a)–c).

Other optional additives include plasticizers such as tricresyl phosphate or diphthalates and chlorinated paraffins; pigments and fillers such as titanium dioxide, barium sulphate, chalk and carbon black; catalysts such as N,N-dimethylbenzylamine, N-methylmorpholine, lead octoate and dibutyltin dilaurate; flow control agents; thickeners; stabilizers such as substituted phenols; and adhesion promoters such as organo-functional silanes.

Coating compositions based on isocyanate prepolymers according to the invention are suitable in particular for producing two-dimensional sealants in the building construction sector, due to their outstanding mechanical properties and their high resistance to hydrolysis. The mechanical and optical properties of these products are substantially unaffected by aging or exposure to light.

The following examples are intended to explain the process according to the invention but not to restrict the invention. All percentages are with reference to percent by weight.

EXAMPLES

The following polyols were used in the examples and comparison examples:

Polyol A

A liquid polyester polycarbonate diol prepared in accordance with DE-AS 1,770,245 from hexanediol-1,6, ε-caprolactone and diphenyl carbonate in the molar ratio of 8:8:7. OH value 56, viscosity 20 000 mPa.s (23° C.).

Polyol B

A polyether diol prepared by the alkoxylation of propylene glycol with a mixture of propylene oxide and ethylene oxide in a weight ratio of 1:1; OH value 56, viscosity 350 mPa.s (23° C.).

Polyol C

A polyether diol prepared by the propoxylation of propylene glycol; OH value 112, viscosity 150 mPa.s (23° C.).

Example 1

NCO prepolymer according to the invention

An NCO prepolymer having an NCO content of 2.7% was prepared from 1000 parts by wt. of polyol A, 1000 parts by wt. of polyol B and 304.8 parts by wt. of 2,4-diisocyanatotoluene by stirring together at 60° C. The product was diluted with 200.5 parts by wt. of methoxypropyl acetate to produce an NCO prepolymer having the following characteristics:

Solids content: 90%

NCO content: 2.5%

Residual monomer content: 0.08%

Viscosity: 9700 mPa.s (23° C.)

Preparation of a moisture hardening coating:

A film was applied to a glass plate and dried in the air within 9 hours to provide a highly elastic coating having the following mechanical properties:

Tear resistance: 8.1 N/mm$^2$

Elongation at break: 765%

Tear propagation resistance: 14.9 N/mm

Shore A hardness: 54

Example 2

NCO prepolymer according to the invention

An NCO prepolymer having an NCO content of 3.5% was prepared by stirring together at 60° C. 1000 parts by wt. of polyol A, 500 parts by wt. of polyol C and 304.8 parts by wt. of 2,4-diisocyanatotoluene. The product was diluted with 200.5 parts by wt. of methoxypropyl acetate. An NCO prepolymer having the following characteristics was obtained:

Solids content: 80%

NCO content: 2.8%

Residual monomer content: 0.14%

Viscosity: 3200 mPa.s (23° C.)

Preparation of a moisture hardening coating

A film was applied to a glass plate and hardened within 9 hours to provide a clear, highly elastic coating having a Shore A hardness of 58.

Example 3

NCO prepolymer according to the invention

An NCO prepolymer having an NCO content of 17.9% was prepared by stirring together at 80° C. 1000 g of polyol A, 1000 g of polyol B and 2220 g of IPDI. Excess diisocyanate was removed by vacuum film distillation at 150° C./0.2 mbar. 2230 g of a viscous resin having an NCO content of 3.3% was obtained, which was diluted with 557 g of methoxypropyl acetate to produce an NCO prepolymer having the following characteristics:

Solids content: 80%
NCO content: 2.6%
Residual monomer content: 0.1%
Viscosity: 920 mPa.s (23° C.)
Preparing a moisture hardening coating:
A sample of the prepolymer was stirred up with 0.05 wt. % of dibutyltin(IV) dilaurate. A film was applied to a glass plate and dried in the air within 12 hours to provide a clear, elastic coating having a Shore A hardness of 52.

Example 4

NCO prepolymer according to the invention

An NCO prepolymer having an NCO content of 16.3% was prepared by stirring together at 80° C. 1000 g of polyol A, 1000 g of polyol B and 2620 g of bis-(4-isocyanatocyclohexyl)-methane. Excess diisocyanate was removed by vacuum film distillation at 160° C./0.2 mbar. 2420 g of a viscous resin having an NCO content of 3.1% was obtained, which was diluted with 605 g of methoxypropyl acetate. The NCO prepolymer obtained had the following characteristics:

Solids content: 80%
NCO content: 2.5%
Residual monomer content: 0.2%
Viscosity: 1200 mPa.s (23° C.)

Example 5

Comparison NCO prepolymer

A prepolymer having carbonate and ester groups was prepared by reacting 2000 g of polyol A and 2220 g of IPDI at 80° C. until an NCO content of 17.9% was obtained. Excess isophorone diisocyanate was removed by vacuum film distillation at 150° C./0.2 mbar. 2190 g of a viscous resin having an NCO content of 3.4% was obtained. The product was diluted with 547 g of methoxypropyl acetate to produce an NCO prepolymer having the following characteristics:

Solids content: 80%
NCO content: 2.7%
Residual monomer content: 0.1%
Viscosity: 9500 mPa.s (23° C.)

Example 6

(comparison example not according to the invention)

A prepolymer having ether groups was prepared by reacting 1000 g of polyol B and 1000 g of polyol C with 2610 g of 2,4-diisocyanatotoluene at 60° C. until an NCO content of 24.5% was achieved. Then the excess diisocyanatotoluene was removed by vacuum film distillation at 150° C./0.2 mbar. A liquid isocyanate prepolymer having the following characteristics was obtained:

Solids content: 100%
NCO content: 4.4%
Residual monomer content: 0.15%
Viscosity: 6500 mPa.s (23° C.)

Example 7

Coating compositions and weathering properties

The NCO prepolymers from examples 1, 3, 5 and 6 were processed in a vacuum dissolver in accordance with the following formulation to produce coating compositions:

|  | Parts by wt. |
| --- | --- |
| NCO prepolymer | 45.5 |
| Barytes | 41.9 |
| Titanium dioxide | 2.7 |
| Methoxypropyl acetate | 4.8 |
| Dibutyltin dilaurate | 0.1 |
| Hardener OZ* | 5.1 |

*Urethane-bisoxazolidine, a commercial product of Bayer AG

The coating compositions were applied to test sheets in a layer thickness of 2 mm and, after hardening, were weathered for 2000 hours in a commercial accelerated weathering unit (Xenon test 1200).

| | Results of accelerated weathering: | | | |
| --- | --- | --- | --- | --- |
| Prepolymer from ex. no: | 1 | 3 | 5 | 6 |
| Chalking | none | none | none | very marked |
| Brittleness | none | none | none | marked |
| Change in color | small | small | small | small |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An isocyanate prepolymer which has an NCO content of 1.5 to 5.0 wt. % and a monomeric diisocyanate content of less than 0.5 wt. %, and is the reaction product of A) an isocyanate component consisting essentially of one or more aromatic or cycloaliphatic diisocyanates and B) a polyol component consisting essentially of a mixture of B1) one or more polyether polyols having a molecular weight of 1000 to 3000 and an average hydroxyl functionality of 2 to 4 and B2) one or more polyester carbonate diols having a molecular weight of 700 to 3000 and prepared from (i) one or more diols having a maximum molecular weight of 200, (ii) ε-caprolactone and/or ε-hydroxycaproic acid and (iii) diaryl carbonates, wherein components (i) and (ii) are present in a molar ratio of 4:1 to 1:3, wherein component B1) and B2) are present in a weight ratio of 0.25:1 to 1.5:1.

2. The isocyanate prepolymer of claim 1 wherein component A) consists essentially of one or more diisocyanates having isocyanate groups with different reactivity.

3. The isocyanate prepolymer of claim 2 wherein component B1) is a polyether polyol having an average molecular weight of 1500 to 2000 and containing ethylene oxide and propylene oxide units in a weight ratio of 30:70 to 60:40.

4. The isocyanate prepolymer of claim 1 wherein component A) consists essentially of 2,4-diisocyanatotoluene.

5. The isocyanate prepolymer of claim 4 wherein component B1) is a polyether polyol having an average molecular weight of 1500 to 2000 and containing ethylene oxide and propylene oxide units in a weight ratio of 30:70 to 60:40.

6. The isocyanate prepolymer of claim 1 wherein component B1) is a polyether polyol having an average molecular weight of 1500 to 2000 and containing ethylene oxide and propylene oxide units in a weight ratio of 30:70 to 60:40.

7. The isocyanate prepolymer of claim 1 wherein component B2) is a polyester carbonate diol prepared from (i) hexanediol-1,6, (ii) ε-caprolactone and (iii) diphenyl carbonate.

8. The isocyanate prepolymer of claim 2 wherein component B2) is a polyester carbonate diol prepared from (i) hexanediol-1,6, (ii) ε-caprolactone and (iii) diphenyl carbonate.

9. The isocyanate prepolymer of claim 3 wherein component B2) is a polyester carbonate diol prepared from (i) hexanediol-1,6, (ii) ε-caprolactone and (iii) diphenyl carbonate.

10. The isocyanate prepolymer of claim 4 wherein component B2) is a polyester carbonate diol prepared from (i) hexanediol-1,6, (ii) ε-caprolactone and (iii) diphenyl carbonate.

11. The isocyanate prepolymer of claim 5 wherein component B2) is a polyester carbonate diol prepared from (i) hexanediol-1,6, (ii) ε-caprolactone and (iii) diphenyl carbonate.

12. The isocyanate prepolymer of claim 6 wherein component B2) is a polyester carbonate diol prepared from (i) hexanediol-1,6, (ii) ε-caprolactone and (iii) diphenyl carbonate.

13. A process for preparing the isocyanate prepolymers of claim 1 which comprises reacting an isocyanate component A) consisting essentially of one or more cycloaliphatic or aromatic diisocyanates with a polyol component B) consisting essentially of a mixture of B1) one or more polyether polyols having a molecular weight of 1000 to 3000 and an average hydroxyl functionality of 2 to 4 and B2) one or more polyester carbonate diols having a molecular weight of 700 to 3000 and prepared from (i) one or more diols having a maximum molecular weight of 200, (ii) ε-caprolactone and/or ε-hydroxycaproic acid and (iii) diaryl carbonates, wherein components (i) and (ii) are present in a molar ratio of 4:1 to 1:3, wherein component B1) and B2) are present in a weight ration of 0.25:1 to 1.5:1, while maintaining an NCO/OH equivalent ratio of at least 1.5:1 and optionally removing unreacted monomeric diisocyanate down to a residual content of less than 0.5 wt. %.

14. A binder-containing coating or sealing composition wherein the binder comprises the isocyanate-prepolymer of claim 1.

* * * * *